United States Patent [19]

Schlemmer et al.

[11] 4,374,596

[45] Feb. 22, 1983

[54] PIPE-FORM CONNECTOR FOR CABLE DUCTS

[75] Inventors: Josef Schlemmer; Adolf Konig, both of Munich, Fed. Rep. of Germany

[73] Assignee: Josef Schlemmer GmbH, Munich, Fed. Rep. of Germany

[21] Appl. No.: 23,328

[22] Filed: Mar. 23, 1979

[30] Foreign Application Priority Data

Jun. 30, 1978 [DE] Fed. Rep. of Germany ....... 2828893

[51] Int. Cl.³ .............................................. F16L 37/08
[52] U.S. Cl. .................................... 285/305; 285/150;
285/419; 285/423; 285/DIG. 22; 138/155; 138/162
[58] Field of Search .............. 285/373, 419, 319, 305,
285/370, 397, DIG. 4, 150, 155, 156,
422, 423; 138/155, 162, 166

[56] References Cited

U.S. PATENT DOCUMENTS

| 786,911 | 4/1905 | Miles et al. | 285/155 |
|---|---|---|---|
| 1,661,674 | 3/1928 | Osborn | 285/314 |
| 1,969,588 | 8/1934 | Sweet | 285/155 X |
| 2,116,165 | 5/1938 | Ullman | 285/419 |
| 3,425,456 | 2/1969 | Schibig | 138/162 |
| 3,572,395 | 3/1971 | Burns | 138/162 |
| 3,633,943 | 1/1972 | Ramm | 285/156 X |
| 3,926,222 | 12/1975 | Schroy | 138/155 X |

FOREIGN PATENT DOCUMENTS

1387002 12/1964 France ................... 285/419

Primary Examiner—Dave W. Arola
Attorney, Agent, or Firm—Jerry Cohen

[57] ABSTRACT

An electrical duct connector has a pipe form of essentially the same cross-section geometry as duct ends to be connected thereby, but of an outer wall diameter (or the like) corresponding to the interior diameter or the like of the duct ends so that the connector fits snugly into the duct ends. The connector may have two, three or more ends and is made of multipiece form with elongated tongue and groove connections in mating wall portions including, preferably, gaps near the ends of the tongues and teeth from the opposite portion of the split construction of any given connector to engage the gaps and preferably also comprising exterior catches for duct ends with reliefs in the connector wall to make the catches resilient and further locking element such as a pin connection at an angle elbow (if any) of the split-construction connector.

4 Claims, 11 Drawing Figures

PIPE-FORM CONNECTOR FOR CABLE DUCTS

BACKGROUND OF THE INVENTION

The invention refers to a pipe-form connector for cable ducts with two or more connecting pieces, the end sections of which are formed as plug-type connectors for pipes.

Electrical lines laid in machines, apparatus, and particularly in motor vehicles, such as e.g. trucks and busses, as also in other large equipment, must be protected against external effects, whether they be of a mechanical nature or whether they are caused by the weather. According to prior art, such electrical lines, which are gathered together for the most part to form a so-called cable loom and are often pre-fabricated ready for use in the respective machine or type of vehicle, are incorporated into ducts and these ducts are then installed. Such cable ducts must be cut down to correspond to the fabricated cable looms and be joined end-to-end by means of pipe connectors. Pipe connectors can be, for example, simple, straight couplers, elbows, or multilateral branch pieces, which are inserted between the individual rounds of the cable ducts.

Cable ducts made of plastic are also known, particularly those made of polyamides and these are joined underneath each other by means of pipe connectors, as is common in water system constructions. It is necessary for this purpose that the pipe ends be threaded and that the pipe connectors have a screw cap on each of their end sections. A gasket is also inserted into this screw cap, thus assuring a tight connection when the screw cap is screwed on.

Pipe connectors thus formed call for a considerably increased diameter with respect to the running cable duct and therefore require a relatively large mounting space. In particular, an additional mounting space is needed for manipulating the screw cap, if the lines are not already fabricated with the cable ducts and pipe connectors prior to assembly.

However, the above has a basic disadvantage, since the lines must be threaded through the close section of the pipe connector. This work is very time consuming and thus labor-intensive, if the lines are very long. In vehicle construction, for example in busses, trailers, and semi-trailer trucks, line lengths of 20–40 meters occur throughout.

Corrugated pipes are also used as cable ducts, especially those in which the ribs of the corrugated pipe are arranged parallel to each other in the planes perpendicular to the longitudinal axis of the pipe. In this way the pipe ends do not have to be threaded, but rather the pipe connector must have an outside thread instead of the screw cap. A slotted spring washer is then introduced onto the pipe ends in the last or next-to-last groove of the pipe for purposes of attachment, and the pipe end is attached to the pipe connector by means of a screw cap introduced beforehand on the pipe ends with a gasket inserted in between.

In pipe connections assembled in this way, the long electrical lines must not only be drawn through the pipe connector itself, the screw cap, and the gasket ring, but also msut be drawn through the slotted, spring washer. There is also the necessity that the pipe connector be threaded on each of its end sections.

It is a principal object of the invention to avoid the above-stated disadvantages in connection with the manufacture of cable looms.

It is a further object of the invention, consistent with the foregoing, to avoid or reduce the amount of tedious line threading and pulling lines through pipe connectors and attendant shaping of pipe connectors per se.

It is a further object of the invention, consistent with the foregoing, to provide simpler and lower cost forms of pipe connectors, achieving such economies through, among other things, eliminating the need for special screw caps, sealing gaskets, spring washers and the like as well as avoiding the need for screw threading.

It is a further object of the invention, consistent with the foregoing, to reduce mounting space required for connectors.

SUMMARY OF THE INVENTION

In accordance with the invention connectors are formed in pipe form with two ends, or three or four ends, in Y-, X- and other configurations so that to accommodate the various arrangements of intersecting electrical duct paths that may need connection. The pipe connector ends correspond generally in geometry to the duct ends, both as to form and size; but, (taking a circular case for example) the pipe connectors ends' external diameter would correspond to the internal diameter of the duct end so as to fit therein snugly when assembled end-to-end protecting electrical wiring which passes through both the duct end and connector from external weather or ambient conditions. The fit is sufficiently snug through dimensioning of the respective parts and/or through other securing means described below to provide a holding together with the pipe connector and duct ends without use of separate connectors or the like.

The length of pipe connector which enters cable duct ends is small and variable and this facilitates assembly. Also expediting assembly is a two-part construction of the connector so that it yields slightly upon entry into a duct end.

The two-part construction of the pipe connectors also includes connecting elements, preferably of elongated tongue and groove form. The two-part construction, with the connecting elements, involves a longitudinal split of the pipe connector, the split portions thereof being referred to herein as "shell sections." It is preferred to have the connecting elements formed in a continuous fashion over substantially the entire length of separating edges of the shell sections so that joints are combined particularly tightly after two shell sections are assembled to protect against penetration of dirt and moisture at such connecting joints. But such connecting joints have breaks next to insertion ends of the pipe connector, at least on the side of the separating edges of the shell where there is to be a meshing together when the shells are assembled (that is, there can be a connection of shells where edges on both sides are connected or an initial loose connection at one side of a shell and pivoting down to make the other side connect up). Breaks in the joints are arranged such that a short piece of the tongue is missing a corrresponding piece of the groove is missing on the other shell so that holes in the tongue are interlocked in the piece of filled groove like teeth when the shells are assembled. In this way the shells cannot shift in longitudinal position against each other (other circumferentially other than for slight yielding).

Within one or more acute angle (or obtuse angle) elbows formed by the pipe connector that are a complementary peg and hole for locking to supplement the locking action of the above-described tongue and groove construction.

Catches may be provided on the exterior vent sections of the pipe connector to further protect against longitudinal inadvertent pulling out of the pipe connector from duct ends and these work particularly well with corrugated cable duct ends wherein the catches nest in the corrugations. Such catches are supplemented by cutouts in the pipe connector end just behind such catches so that the catches can yield backwards as they are inserted into a duct end. Preferably an additional slot is formed in the pipe connector end just forward of such catches too, although not as wide as the slot behind the catch. It is preferred to bevel the catches in the insertion direction. The difference in width of the slots in front of and behind the catch assures that the catch will yield substantially during insertion but be unyielding in response to pulls in the opposite direction or motion, i.e in the sense of pulling out of the cable duct end.

Other objects, features and advantages of the invention will be apparent from the following detailed description of preferred embodiments thereof taken in connection with the accompanying drawing, in which,

DETAILED DESCRIPTION OF PREFERRED EMBODIMENTS

Figure 1:
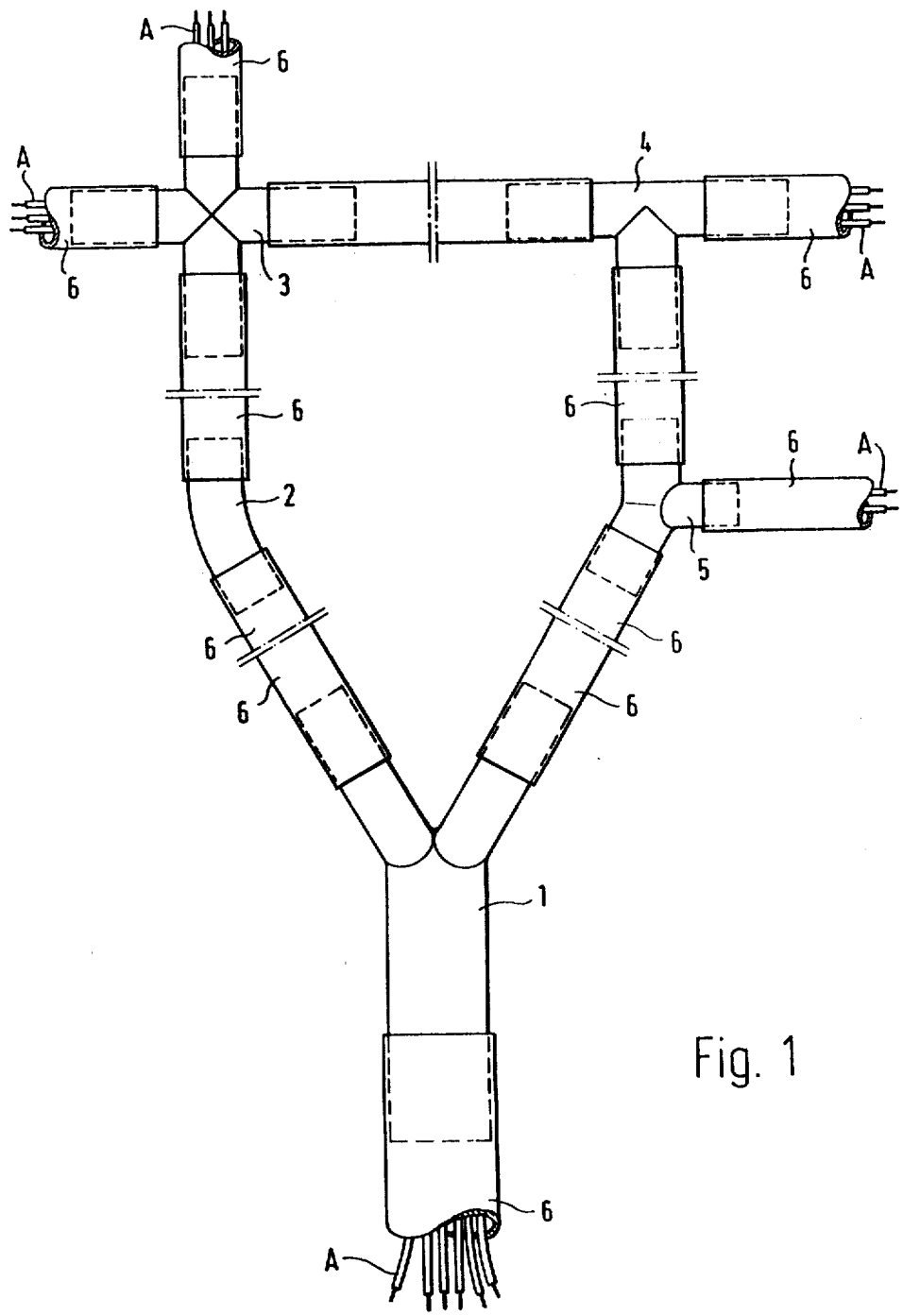
FIG. 1 is a schematic drawing of a ready-for-installation cable loom containing cable ducts and pipe connectors, illustrating the variety of arrangements that have to be accommodated.

FIG. 1 illustrates a portion of a cable loom for motor vehicles and the like, which has an armor that sheathes lines A; this armor is comprised of pipes and various form-stable pipe connectors fastening these pipes together. Depicted are a Y-shaped pipe connector 1, an arcuate pipe connector 2, a cross-shaped pipe connector 3, a square or rectangular pipe connector 4, and a pipe connector 5 similar in form to pipe connector 1. The electrical lines A between these pipe connectors are protected by cable ducts 6, which are cut into lengths corresponding to the distances between the individual pipe connectors. These cable ducts can be fabricated either from rigid or flexible materials.

Figure 2:
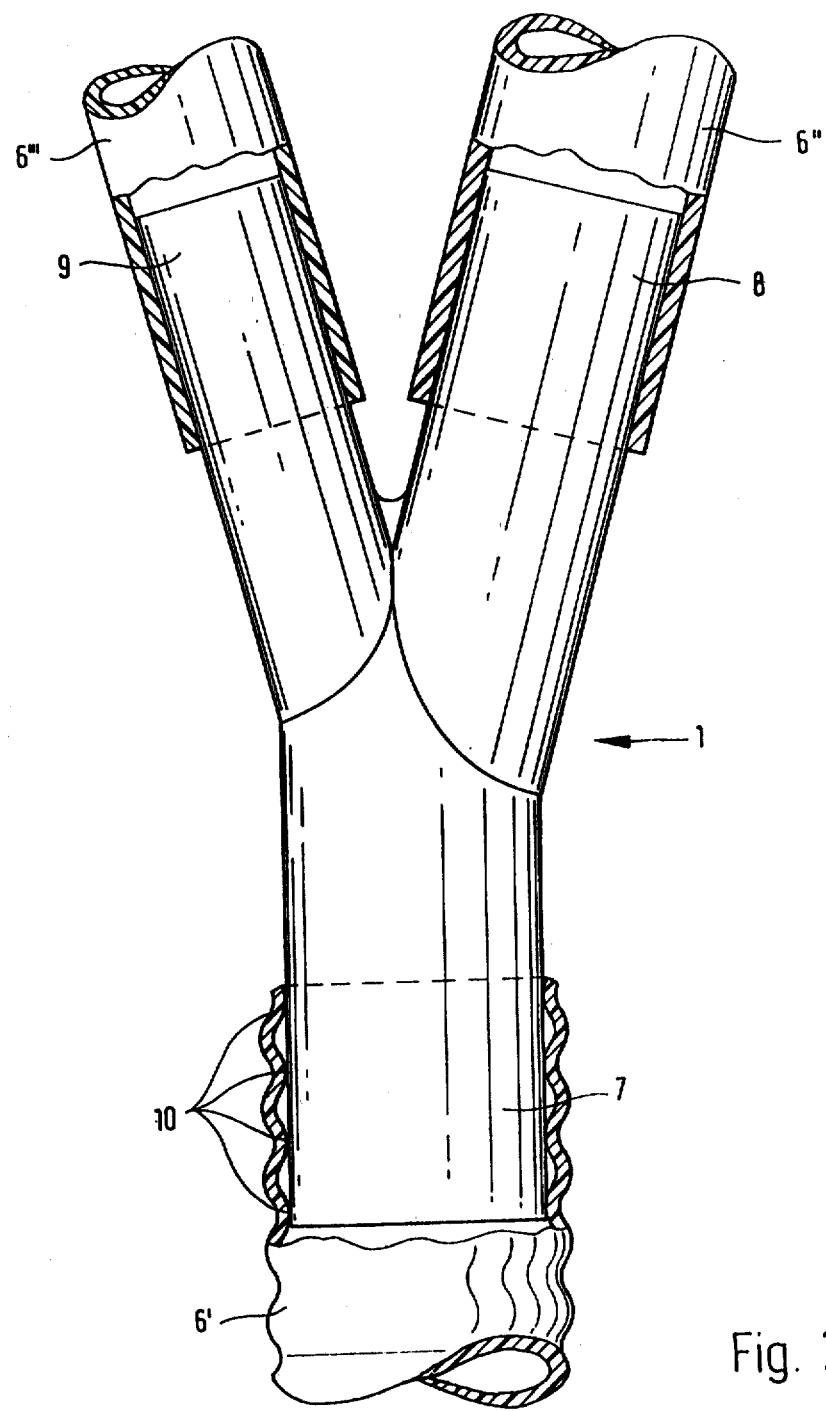
FIG. 2 is an enlarged, partially sectioned, plan view of a pipe connector installed to accommodate three duct ends meeting at a Y-intersection with different sizes of the connector elements to accommodate different sizes of the duct ends (note that the duct ends are of different types comprising straight, cylindrical and corrugated forms)

FIG. 2 shows the enlarged diagram of the Y-shaped pipe connector 1 with cross sections of varying size for the individual end sections 7, 8, and 9. These end sections are inserted into the cable ducts 6', 6", and 6''' which have different diameters adapted correspondingly. In this way the cable duct 6' is formed as a corrugated pipe, whereby the rings 10 of the corrugated pipe 6' which lie directly on end section 7 of pipe connector 1 operate as individual sealing rings. The end sections 7, 8, and 9 fo pipe connector 1 can be inserted into the cable duct to various depths and in this way a limited length equalization is possible between the cable ducts which are to be joined.

Figure 3:
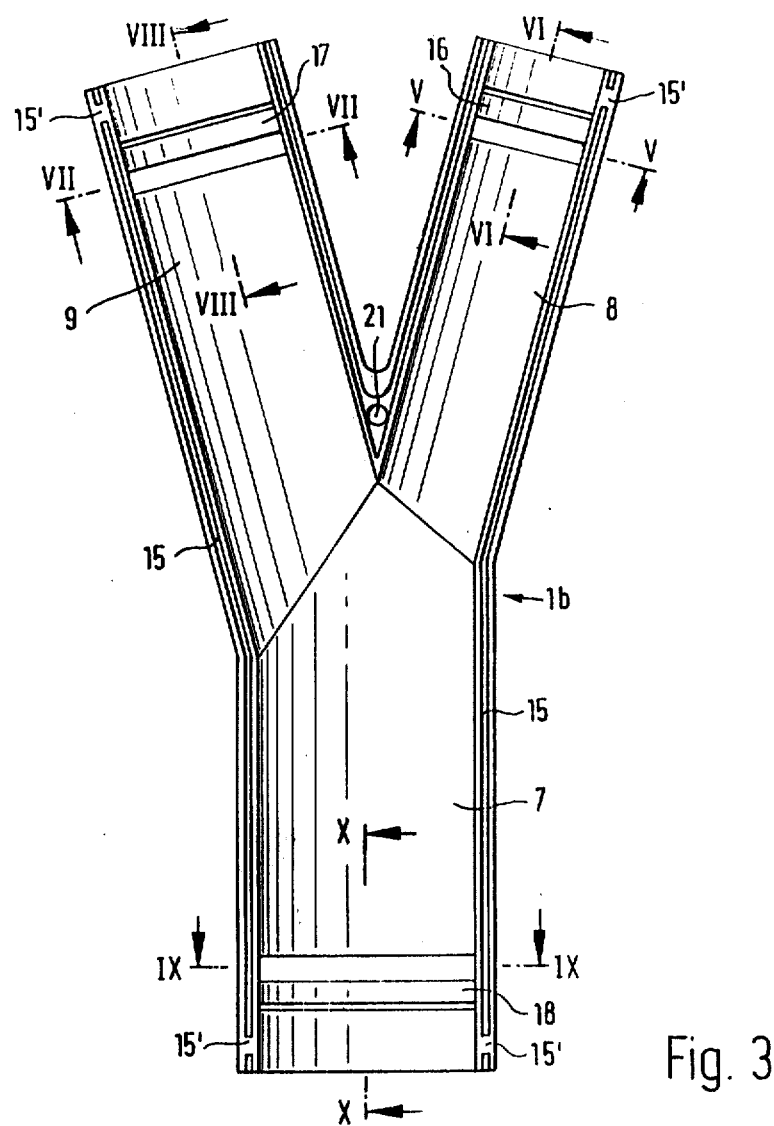
FIG. 3 is a top view of the inner side of a lower shell portion of the pipe connector of FIG. 2, particularly illustrating the groove of tongue and groove locking construction, the hole of hole and peg supplementary locking means at an acute angle elbow therein and the catches on ends of the pipe connector and supplementary slots therefor (as mentioned above)
Figure 4:
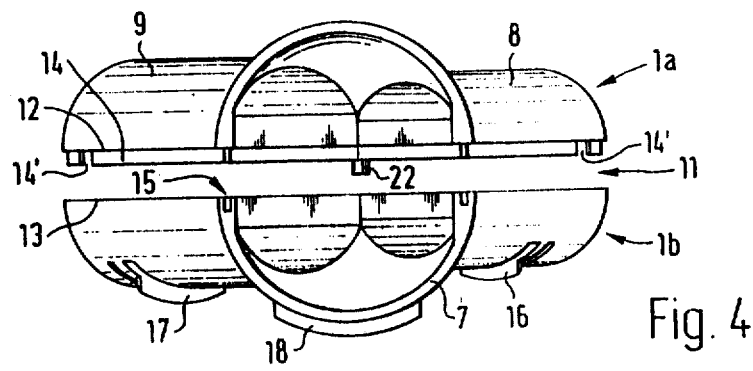
FIG. 4 is an end view of exploded form showing two sections slightly spaced from each other but ready to close the spacing there between for purposes of assembly in a complete pipe connector and illustrating substantially the same features as is mentioned above for FIG. 3.
Figure 5:
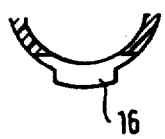
FIGS. 5-10 are sectional views taken according to section lines V—V-X—X of FIG. 3, respectively, with the modification that instead of showing a single shell section, both shell sections of a pipe connector are shown in FIGS. 5, 7 and 9.
Figure 6:
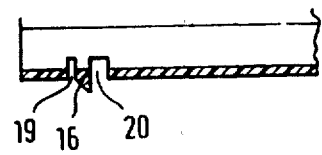
Figure 7:
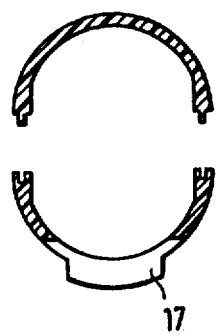
Figure 8:
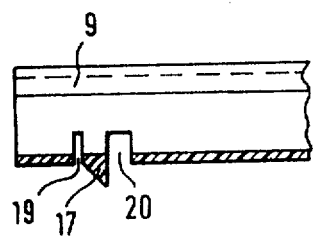
Figure 9:
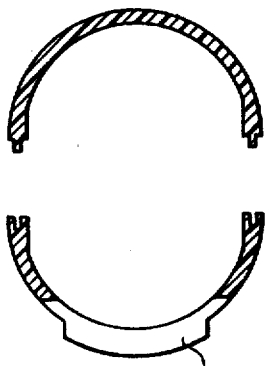
Figure 10:
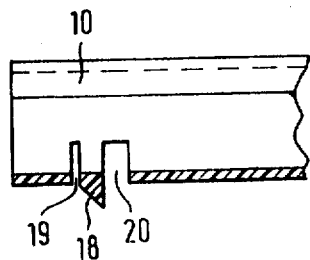
Figure 11:
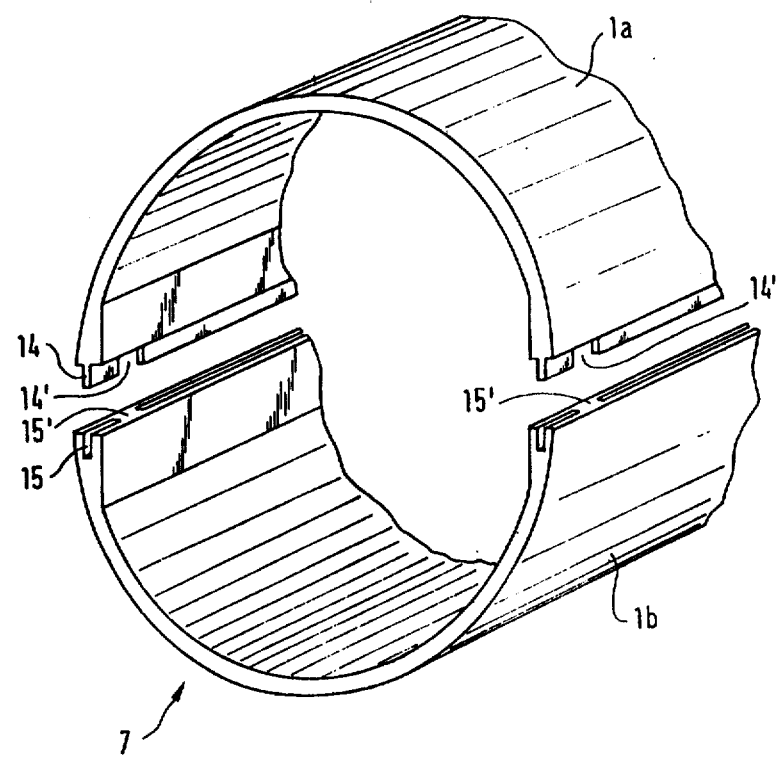
FIG. 11 is a perspective view of the end of a pipe connector section.

FIGS. 3, 4, and 11 show the two-part shape (shells) of the pipe connector 1, which consists of the upper shell portion 1a and the lower shell portion 1b. The joint 11 between the two shells 1a and 1b is in the same diametral plane which contains all three longitudinal axes of the pipe connector. The separating edges 12 of the upper shell portion 1a and 13 of the lower shell portion 1b, lying next to each other, have connecting components, whereby connecting element 14 on the upper shell portion 1a is formed like a tongue while connecting element 15 on lower shell portion 1b is shaped like a groove. These connecting elements are continuously formed over the entire length of the separating edges. FIG. 3 shows the continuous groove 15 on separating edge 13 of the lower shell portion 1b.

The tongues 14 or grooves 15 at least one side of the separating edges 12 or 13 of shells 1a and 1b are broken in the vicinity of the insertion end of each end section 7, 8, or 9. In tongues 14, a short piece is missing, thus forming break 14', while in the grooves there is a short piece filled with material in the length corresponding to the break in tongue 14' so that the break 15' is formed. In joining the two shell sections, breaks 14' and 15' operate as teeth and lock the shell sections so that they are no longer able to shift in a lengthwise direction.

Shell sections 1a and 1b further comprise a locking device, which facilitates rapid and accurate mounting. A blind hole 21 is provided in the lower shell section 1b in the acute angle elbow between the two end sections 8 and 9. In the construction of the devices material can also be provided in an obtuse angle formed of the pipe connector, or even on a straight section of the pipe connector, for such locking means. But the usage of an acute angle portion as shown is preferred. A peg 22 is provided in a corresponding elbow portion of the upper shell section 1a and such peg interlocks positively in blind hole 21 when the two shell sections 1a and 1b are assembled.

The separating edges of joint 11 of the pipe connector thus provided with tongue and groove permit an accurate joining of the two shell sections 1a and 1b after mounting the electric lines and simultaneously assure that the electrical lines are protected against the penetration of dirt and moisture.

These pipe connectors thus assembled, no matter what their geometrical form, are then introduced by their end sections into the cable ducts to be connected.

The diameters of the end sections are adapted to the inside diameter of the cable ducts to be connected—in the case of pipe connector 1, these are end sections 7, 8, and 9—so that a sufficient adhesion is obtained and a pulling or falling out is avoided.

In order to assure an even better connection, catches are provided on the end sections of the pipe connectors, which can catch in the ribs of the cable ducts which are formed as corrugated pipes. These catches are shown in various views in FIGS. 3–10.

Ring-type catches 16, 17, and 18 are provided in lower shell section 1a at a short distance in front of the opening end of each end section 7, 8, and 9 of pipe connector 1. Such catches could also be present in the upper shell section 1a, but this is not absolutely necessary.

A narrow slot 19 is provided between the opening end of each end section and catches 16, 17, and 18, which slot, however, is not absolutely necessary. Behind the catches at the center of the pipe connector, there is an essentialy wider slot 20. These two slots provide the catches with a sufficient elasticity and mobility so that they can yield when the pipe connectors are inserted into the ends of the cable ducts without the occurrence of excess stress. Catches 16, 17, and 18 in the insertion direction are shaped like an oblique plane, whereupon a easy insertion into the pipe ends is also assured. On the other hand, this shape of the catches makes it possible for the pipe connectors to pull away from the cable ducts only if a great force is applied.

The pipe connector embodiments 2, 3, 4, and 5 shown also in FIG. 1 along with pipe connector 1 described above are formed like pipe connector 1, apart from their geometrical shape. With respect to the end sections of the other pipe connectors, these sections are also provided with catches on their lower shell component. Such pipe connectors can be formed according to a variety of geometrical requirements.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Pipe-form connector for cable duct ends comprising longitudinally split shell portions of the connector with complementary elongated joint elements of a direct push and pull assemblable and disassemblable type running substantially the full lengths of such elements and arranged parallel to longitudinal axes of the connector, the shells being assemblable at such edges and holdable in assembled position by the joint elements to form sections uniformly corresponding to cable duct ends and internally insertable into the duct ends to be connected with a snug fit but removable therefrom, and being constructed of substantially the same form and size of said duct ends, but being sufficiently smaller than the duct ends only to the extent necessary for snug-fitting insertion therein to form interconnecting conduits between the various duct ends, substantially as extensions thereof, and means to prevent longitudinal slippage between joint elements and to cause yielding of the connector as one of its ends enters a duct end and to permit length equilibration, and further comprising exterior end catches on its ends to lock within corrugations or like recesses of a cable duct end by engaging within them, and wherein the catch is supplemented by slots in front of and behind it with the slot behind being wider than the slot in front to provide easier yielding on insertion of the pipe form connector than upon withdrawal from a cable duct end.

2. Pipe-form connector in accordance with claim 1 wherein the catch is in the form of a rib running along a circumferential portion of pipe-form connector end, substantially in a plan perpendicular to the local longitudinal axis of the pipe-form connector end and the rib being bevelled in the insertion direction for such pipe-form connector end.

3. Pipe-form connector for cable duct ends comprising longitudinally split shell portions of the connector with complementary elongated joint elements of a direct push and pull assemblable and disassemblable type running substantially the full lengths of such elements and arranged parallel to longitudinal axes of the connector, the shells being assemblable at such edges and holdable in assembled position by the joint elements to form sections uniformly corresponding to cable duct ends and internally insertable into the duct ends to be connected, with a snug fit but removable therefrom, and being constructed of substantially the same form and size of said duct ends, but being sufficiently smaller than the duct ends only to the extent necessary for snug-fitting insertion therein to form interconnecting conduits between the various duct ends, substantially as extensions thereof, and first means to prevent longitudinal slippage between joint elements, and comprising exterior end catches separate from said first means on its ends to lock within corrugations or like recesses of a cable duct end by engaging within them, and wherein the catch is supplemented by slots in front of and behind it with the slot behind being wider than the slot in front to provide easier yielding on insertion of the pipe-form connector than upon withdrawal from a cable duct end.

4. Pipe-form connector in accordance with claim 3 wherein the catch is in the form of a rib running along a circumferential portion of pipe-form connector end, substantially in a plane perpendicular to the local longitudinal axis of the pipe-form connector end and the rib being bevelled in the insertion direction for such pipe-form connector end.

* * * * *